United States Patent [19]

Bledsoe et al.

[11] Patent Number: 5,395,683
[45] Date of Patent: Mar. 7, 1995

[54] PROTECTIVE PAD

[75] Inventors: Elizabeth S. Bledsoe, Blackstone, Va.; Steven P. Witschen, Aberdeen, N.C.

[73] Assignee: AlliedSignal Inc., Morris Township, Morris County, N.J.

[21] Appl. No.: 38,721

[22] Filed: Mar. 26, 1993

[51] Int. Cl.$^6$ ................................. B32B 7/00
[52] U.S. Cl. ........................ 428/253; 2/267; 428/902; 428/911
[58] Field of Search ........ 428/253, 902, 911; 30/381; 2/267

[56] References Cited

U.S. PATENT DOCUMENTS

| | | | |
|---|---|---|---|
| 4,279,956 | 7/1981 | Bartels | 428/192 |
| 4,280,342 | 7/1981 | Eng et al. | 66/177 |
| 4,351,065 | 9/1982 | Bouchard | 2/23 |
| 4,413,110 | 11/1983 | Kavesh et al. | 526/348 |
| 4,440,711 | 4/1984 | Kwon et al. | 264/185 |
| 4,457,985 | 7/1984 | Harpell et al. | 428/224 |
| 4,535,027 | 8/1985 | Kobashi et al. | 428/364 |
| 5,082,721 | 1/1992 | Smith et al. | 428/253 |
| 5,095,544 | 3/1992 | Elverskog | 2/22 |
| 5,198,280 | 3/1993 | Harpell et al. | 428/102 |
| 5,254,383 | 10/1993 | Harpell et al. | 428/253 |

OTHER PUBLICATIONS

U.S. Dept. of Agriculture, Forest Services, Equipment Development Center, "Chain Saw Chaps Redesign" by Ted Putnam, George Jackson and Jeff Davis.

American Pulpwood Association, Inc. "leg Protection For Chain Saw Users (1992)" Jan. 1992 Revision.

*Primary Examiner*—James J. Bell
*Attorney, Agent, or Firm*—Wayne W. Rupert

[57] ABSTRACT

A pad for protecting at least a portion of the human body against injury including at least three hybrid fabric layers, each hybrid fabric layer comprising at least one high strength fiber having a tensile modulus of at least about 160 grams/denier and a tenacity of at least about 7 grams/denier and at least one ground fiber, wherein the hybrid fabric layer has a construction selected from the group consisting of a weft knit of the high strength fiber and the ground fiber, a warp knit of the high strength fiber and the ground fiber, an inserted warp knit wherein the high strength fiber is inserted into a warp knit of the ground fiber, and a stitchbonded knit.

14 Claims, No Drawings

PROTECTIVE PAD

BACKGROUND OF THE INVENTION

The present invention relates to a protective pad for use in clothing, especially clothing intended to protect a human body against cuts or other injuries from chain saws or other sharp, mechanized tools. The protective pad includes a plurality of fabric layers and is intended primarily for use as an insert in a garment.

Various constructions for pads or fabrics that are purported to provide protection against chain saws and other sharp, mechanized tools have been tried. As of the filing date of this application, the U.S. Forest Service, pursuant to their August 1982 report titled "Chain Saw Chaps Redesign" (publication no. ED & T 9102), uses and recommends a protective pad comprised of two layers of style 352 woven Kevlar ®, two layers of needlepunched Kevlar ®, and two outside layers of Cordura nylon, wherein the woven and needlepunched Kevlar ® layers are arranged so that they alternate (Kevlar ® is the trademark of E. I. du Pont de Nemours for their aramid fiber). The 1982 Forest Service Report also mentions that 2 and 3 layers of a "Kevlar/Nylon Raschel Knit" were tested, but that these samples did not receive favorable ratings. Additional commercially available protective pads include one consisting of at least six layers of warp knit polyester (available from Engtex under the product names "Swedepro" and "Stihl") and another one consisting of seven layers of warp knit nylon (available from Elvex Corp. under the product name "Prolar"). U.S. Pat. No. 4,280,342 discloses a protective pad made from a warp knit fabric, the two layers of which are interconnected by pile threads. U.S. Pat. No. 4,279,956 discloses a protective pad made from a composite fabric comprised of at least two superposed fabric layers which are interwoven into a single layer along spaced, substantially parallel strips.

As the speed and cutting strength of chain saws and other sharp, mechanized tools has increased, however, a need has arisen for a lightweight, flexible protective pad which provides improved protection.

SUMMARY OF THE INVENTION

It is therefore an object of the present invention to provide a lightweight and flexible pad for protecting a human body against cuts and other injuries.

In accomplishing the foregoing objects there is provided according to the present invention a protective pad comprising at least three hybrid fabric layers, each hybrid fabric layer comprising at least one high strength fiber having a tensile modulus of at least about 160 grams/denier and a tenacity of at least about 7 grams/denier and at least one ground fiber, wherein the hybrid fabric layer has a construction selected from the group consisting of a weft knit of the high strength fiber and the ground fiber, a warp knit of the high strength fiber and the ground fiber, an inserted warp knit wherein the high strength yarn is inserted into a warp knit of the ground fiber, and a stitchbonded knit.

There also is provided a chain saw chap which includes the above-described protective pad.

Further objects, features and advantages of the present invention will become apparent from the detailed description of preferred embodiments that follows.

DETAILED DESCRIPTION OF THE INVENTION

As used herein, "fiber" denotes continuous filament of a running or extremely long length, or cut or otherwise short fiber known as staple.

"Yarn" denotes a continuous strand having a length dimension which is much greater than the transverse dimensions of width and thickness and produced from a monofilament fiber, by bringing together a plurality of continuous filament fibers or by spinning staple.

An effective protective pad should be washable, drapeable and comfortable to wear as well as provide sufficient protection. With respect to washability, the protective pad should continue to meet performance standards after being subjected to laundering according to AATCC Test Method 96-1988 or AATCC Test Method 158-1985.

The protective pad is made from a plurality of distinct fabric layers. Each fabric layer is a hybrid fabric of a high strength fiber and at least one other different type of fiber, this other fiber type being referred to herein as a "ground fiber". By the term "hybrid fabric" is meant a fabric made from at least two dissimilar fiber types wherein each fiber type forms at least a portion of the fabric construction. Due to this unique construction, significantly improved levels of protection can be achieved with a lightweight and flexible pad.

By "high strength fiber" is meant a fiber having a tensile modulus of at least about 160 grams/denier, preferably of at least about 500 grams/denier, and a tenacity of at least about 7 grams/denier, preferably of at least about 18 grams/denier, and more preferably of at least about 22 grams/denier. Useful high strength fibers include extended chain polyolefin fibers, particularly extended chain polyethylene (ECPE) fibers, aramid fibers, polyvinyl alcohol fibers, polyacrylonitrile and liquid crystal copolyester fibers.

U.S. Pat. No. 4,457,985 generally discusses such extended chain polyethylene and polypropylene fibers, and the disclosure of this patent is hereby incorporated by reference to the extent that it is not inconsistent herewith. In the case of polyethylene, suitable fibers are those of weight average molecular weight of at least 150,000, preferably at least one million and more preferably between two million and five million. Such extended chain polyethylene fibers may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. No. 3,004,699 and GB No. 2051667, and especially as described in U.S. Pat. No. 4,413,110. As used herein, the term of polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these filaments. The tenacity of the filaments should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel filament processes. Many of the filaments have melting points higher than the melting point of the polymer from which they were formed. Thus, for example, high molecular weight polyethylene of 150,000, one million and two million generally have melting points in the bulk of 138° C. The highly oriented polyethylene filaments made of these materials have melting points of from about 7° to about 13° C. higher. Thus, a slight increase in melting point reflects the crystalline perfection and higher crystalline orientation of the filaments as compared to the bulk polymer.

Similarly, highly oriented extended chain polypropylene fibers of weight average molecular weight at least 200,000, preferably at least one million and more preferably at least two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The melting point of the polypropylene is generally raised several degrees by the orientation process, such that the polypropylene filament preferably has a main melting point of at least 168° C., more preferably at least 170° C. The particularly preferred ranges for the above-described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

High molecular weight polyvinyl alcohol (PV-OH) fibers having high tensile modulus are described in U.S. Pat. No. 4,440,711 to Y. Kwon, et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/denier, a tenacity of at least about 7 g/denier (preferably at least about 10 g/denier, more preferably at about 14 g/denier and most preferably at least about 17 g/denier), and an energy to break of at least about 8 joules/g. PV-OH fibers having a weight average molecular weight of at least about 200,000, a tenacity of at least about 10 g/denier, a modulus of at least about 300 g/denier, and an energy to break of about 8 joules/g are more useful in producing a ballistic resistant article. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of at least about 10 g/denier and an energy to break of at least about 8 joule/g. PAN fiber having a molecular weight of at least about 400,000, a tenacity of at least about 15 to 20 g/denier and an energy to break of at least about 8 joule/g is most useful; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fibers will have a tenacity of at least about 20 g/d, a tensile modulus of at least about 400 g/d and an energy-to-break at least about 8 joules/gram, and particularly preferred aramid fibers will have a tenacity of at least about 20 g/d, and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylenediamine terephalamide) filaments produced commercially by Dupont Corporation under the trade name of Kevlar ® 29 and 49 and having moderately high moduli and tenacity values are particularly useful in forming ballistic resistant composites. (Kevlar ® 29 has 500 g/denier and 22 g/denier and Kevlar ® 49 has 1000 g/denier and 22 g/denier as values of modulus and tenacity, respectively). Also useful in the practice of this invention is poly(metaphenylene isophthalamide) filaments produced commercially by Dupont under the trade name Nomex ®.

In the case of liquid crystal copolyesters, suitable fibers are disclosed, for example, in U.S. Pat. Nos. 3,975,487; 4,118,372 and 4,161,470.

Typically, for use in this invention the high strength fibers are formed into yarns via conventional yarn-making techniques, which yarns may be commingled. The yarn denier should range from about 200 to 4800, preferably about 400 to 3000, and more preferably about 650 to 1600.

The hyrid fabric can be a weft knit, a warp knit, an inserted warp knit, or a stitchbonded knit. A knit construction has proven to be the most advantageous because it provides a stable lightweight fabric which is easily fabricated and handled as well as offering an opportunity for a wide variety of geometric designs.

In the weft knit construction a yarn of the high strength fiber is knitted in the weft direction. The high strength yarn is knitted in such a manner so that it is substantially unidirectional. By "unidirectional" is meant that each high strength yarn is positioned in the knit fabric so that it follows a substantially straight path and is substantially parallel to the adjacent high strength yarns. In the case of the weft knit, each high strength yarn also is substantially parallel to the longitudinal axis of the fabric in the weft direction. Positioning of a unidirectional high strength yarn can be accomplished by either a tubular stitch or insertion. Usually, the knit fabric includes an average of 1 to 6, preferably 2 to 5, and more preferably 3, high strength yarns per inch as measured over the length of the fabric.

The ground yarn is fabricated into a knit construction that can hold the unidirectional high strength yarn in place and allow for easy removal of the high strength yarn when the fabric is subjected to a tearing force. Typically, the ground yarn is knitted in a rib stitch or a tubular stitch.

The most preferred weft knit construction is a two needle bed weft knit that has the following course pattern: first course—rib stitch of ground yarn; second course—tubular stitch of ground yarn with the ground yarn stitched on every needle of the front bed; third course—tubular stitch of ground yarn with the ground yarn stitched on every needle of the back bed; fourth course—rib stitch of ground yarn; fifth course—tubular stitch of high strength yarn with the high strength yarn stitched on every other needle of the front bed; sixth course—tubular stitch of high strength yarn with the high strength yarn stitched on every other needle of the back bed. In this construction, nylon is the most preferred ground yarn and an ECPE yarn is the most preferred high strength yarn, especially an ECPE yarn sold by AlliedSignal Inc. under the trademark Spectra®. Since the knit is produced on two needle beds it is considered a double face knit fabric.

This preferred weft knit can be produced on commercially available flatbed weft knit machines which includes at least one yarn carrier and front and back needle beds that have latch needles. In general, the stitch performed for each course is produced by the interaction of the carrier and the needle beds. In other words, as a carrier moves transversely to the beds, the carrier contains the type of yarn that is desired for stitching and the needles are set for the desired stitch pattern. In this instance, from 1 to 6 carriers can be used to produce the preferred weft knit.

The warp knit must be a dimensionally oriented structure in that at least one yarn of the high strength fiber is positioned unidirectionally in the fabric and held in place by a warp knit of at least one yarn of the ground fiber. The high strength yarn can be knitted to achieve this unidirectional positioning resulting in a warp knit of high strength yarn and ground yarn. Preferably, however, the high strength yarn is inserted into a warp knit of the ground yarn. The high strength yarn can be weft inserted (90°), warp inserted (0°), both weft and warp inserted (0° and 90°), and multiaxial. By "multiaxial" is meant that the high strength yarn is inserted at an angle to the running length of the fabric other 0° and 90°. For example, a first high strength yarn can be inserted at angle of 30° and a second high strength yarn can be inserted at angle of 60°.

Each inserted yarn is laid in so that the yarn follows a substantially straight path. Depending on the gauge of the knitting machine and the denier of the high strength yarn, multiple high strength yarns can be inserted per course or wale. The high strength yarn may be inserted every other course, every third course, every fourth course, etc. . . . . Preferably, one high strength yarn is inserted every other course or every third course.

The ground yarn forms the loop construction which holds the inserted high strength yarn in place. In other words, a ground yarn is knitted in the warp direction. The ground yarn can be knitted in a Raschel or tricot knit construction, with Raschel being preferred.

An illustrative example of an inserted warp knit construction is a three bar warp knit fabric with the high strength yarn inserted in the warp direction. This knit could be fabricated by using a first bar to produce a ground yarn stitch, a second bar to produce another ground yarn stitch and a third bar to insert the high strength yarn.

In the case of the stitchbonded knit, the high strength fiber is fabricated into a web or a mat in such a manner that the high strength fiber is aligned unidirectionally. The web or mat could be woven or nonwoven, provided the high strength yarns are aligned unidirectionally. The web or mat also could include a backing material, which material could be a resin or a fiber-reinforced resin. A yarn of the ground fiber is stitched or sewn into the high strength fiber mat or web in order to hold the high strength fibers in place. One possible stitchbonded structure could be a knit produced by a stitchbonding macking available from Malimo.

In general, the high strength fibers constitute about 20 to 80, preferably about 20 to 50, and more preferably about 20 to 30, weight percent of each fabric layer. The amount of high strength fibers can be below 20 weight percent if the number of fabric layers in the pad is increased to above 5. Of course, the weight percent of high strength fibers in a particular pad depends in part upon the type of fiber and knit construction used.

In general, the high strength fibers occupy between about 5 to 95, preferably 15 to 50, and most preferably 15 to 25, volume percent of each layer. The most preferred ranges have been selected to optimize the cost of the high strength fiber versus the degree of protection provided.

As discussed above, the ground fiber provides integrity to the fabric layer by holding the high strength fiber in place until the fabric layer is subjected to a tearing or cutting force exerted by a device such as a chain saw. Any type of fiber that can serve this function can be used in this invention. The fiber should have a low denier to reduce the weight of the fabric, have low shrink properties so that the fabric is washable, and have sufficient surface lubricity to allow the high strength fiber to pull out from the fabric layer when it is subjected to a tearing force. In addition, the ground fiber typically has a lower tenacity than that of the high strength fiber.

Illustrative of the types of ground fibers that could be used are polyamide, polyester, polyacrylonitrile, polyolefin and polyurethane and natural fibers. Examples of possible polyamide fibers include nylon 6, nylon 66, nylon 4, nylon 11 and nylon 6,10. Examples of possible polyester fibers include polyethylene terephthalate, poly-1,4-cyclohexylenedimethylene terephthalate and poly-p-ethyleneoxybenzoate. Examples of possible polyacrylonitrile fibers include acrylic and modacrylic. Examples of possible polyolefin fibers include lower molecular weight polyethylene and polypropylene. An example of a possible polyurethane fiber is spandex. Examples of possible natural fibers include cellulose, cellulose ester and protein fibers. Preferred among these types of fibers are nylon and polyester. Nylon 6 and nylon 66 are particularly preferred, with continuous filament nylon 6 and nylon 66 being the most preferred.

Typically, for use in this invention the non-high strength fibers are formed into yarns via conventional yarn-making techniques, which yarns may be commingled. The yarn denier should range from about 40 to 2000, preferably about 150 to 1600, and more preferably about 300 to 840. The denier of the non-high strength yarn should be at least 50% of the denier of the high strength yarn.

The cross-section of both the high strength fiber and the non-high strength fiber for use in this invention may vary widely. They may be circular, flat, or oblong, or of irregular or regular multi-lobal cross-section having one or more irregular or regular lobes projecting from the linear or longitudinal axis of the filament. It is particularly preferred that the fibers be of substantially circular, flat or oblong cross-section, most preferably the former.

The pad includes at least three fabric layers. Preferably, the pad can have up to five fabric layers. It is possible to have more than five fabric layers, but as the number of layers increases the pad becomes heavier and bulkier making it more difficult to wear. An important advantage of this invention is that the required protection can be provided by only three or four layers. Due to such a limited number of layers, the pad will have a high degree of flexibility and the cost and weight of any protective apparel that includes the pad will be significantly lower. Typically, the pad does not need to include any other types of fabric layers (such as woven fabrics) in addition to the knit fabric layers in order to achieve the desired performance. Indeed, additional layers of other fabric types would raise the cost of the pad, increase the weight of the pad, and probably hamper the performance of the pad.

Each fabric layer in a protective pad can have the same construction or the construction can be varied among the layers. It is preferred that the layers in a pad all have the same construction.

The protective pad of the invention is made by adjacently arranging the knit fabric layers and securing the layers to each other by conventional methods. Illustrative of possible methods for securing the layers include sewing or serging the layers together around the layer perimeter or edge.

The fabric of the present invention allows for easy removal of the high strength fiber upon contact with tearing force. It has been discovered that important criteria that impact the effectiveness of a protective pad are the tenacity of the fiber being removed by the tearing force and the ability for easy removal of the fiber. If the tenacity is below a certain level, the tearing force will cut through the high strength fiber rather than simple pull it out of the fabric. In the case of a chain saw, the removed high strength fibers act to clog the drive sprocket, thereby stopping the movement of the chain saw. Substantially all of the contacted high strength fibers are only partially removed from the fabric rather than completely removed. The high strength yarn should have a low coefficient of friction to allow its removal more readily. Extended chain polyethylene fiber has an advantage in this respect due to its lower coefficient of friction. It is important to recognize that the ground fibers should not be pulled out when subjected to a tearing force. If the ground fibers are pulled out, they would interfere with the removability of the high strength fibers.

When the protective pad forms part of a chain saw chap or other garment designed to protect against cutting from a chain saw, the pad only requires three or four fabric layers to meet the protection standard established by the American Pulpwood Association (A.P.A.) in the January 1992 revision of its standard "Leg Protection for Chain Saw Users", incorporated herein by reference. The testing of the pad for protection chain saws is performed according to ASTM No. F1414 (Standard Test Method for Measurement of Cut Resistance to Chain Saw in Lower Body Protective Garments). The results of the testing are expressed as the "Threshold Stopping Speed (TSS)". TSS is defined by the A.P.A as the maximum saw chain speed measured in feet per minute (fpm) that does not produce a cut through when the chain saw is dropped onto the test specimen. The A.P.A. performance standard is that with the running saw chain moving at a minimum initial speed of 3000 fpm, the cut through time of the test specimen shall not be less than 1.5 seconds at both 45° and 90° to the longitudinal axis of the test specimen.

The protective pad can be formed or cut into any shape which provides the desired area of protection and which is suitable for incorporation into a garment. Illustrative garments which can include the protective pad include shirts, vests, jackets, aprons and pants. Particularly effective for use with the protective pad is a chap, legging, leg guard or gaiter. As used herein, a "chap" "legging" "leg guard" and "gaiter" denote a garment which is worn outside, and may be secured to, an inner garment such as the pants. The American Pulpwood Association (A.P.A.) in the January 1992 revision of its standard "Leg Protection for Chain Saw Users" incorporated herein by reference, provides examples of chap designs and preferred areas of protection. Other examples of chap designs are found in U.S. Pat. Nos. 5,095,544 and 4,351,065, incorporated herein by reference.

The garment is designed so that the protective pad can be secured thereto. Typically, a pocket is formed in the garment for receiving the protective pad and the protective garment is inserted into the pocket. The pocket can be permanently closed or it may be releasably closed so that the protective pad can be easily removed. Alternatively, a covering or a pouch can be placed around the pad and the covering or pouch sewn into the appropriate position on the protective garment.

The protective pad should be incorporated into the garment so that the cutting edge of an object would be expected to strike the high strength fiber at an angle of approximately 90° relative to the longitudinal axis of the high strength fiber. In the case of a chain saw chap, the protective pad should be arranged so that the unidirectional high strength fiber runs parallel to the length of the leg.

In a preferred embodiment, the protective pad consists of three discrete weft knit layers. Each weft knit layer is made from 900 denier or 1200 denier Spectra ® yarn as the high strength yarn and an 840 denier nylon yarn as the non-high strength yarn. The knit construction is the same 6 course construction as that described previously as the preferred weft knit construction. The Spectra ® yarn constitutes about 20 weight percent of each layer. The fabric layers are sewn together around the edges.

From the foregoing description, one skilled in the art can easily ascertain the essential characteristics of this invention, and without departing from the spirit and scope thereof, can make various changes and modifications of the invention to adapt it to various usages and conditions.

We claim:

1. A pad for protecting at least a portion of the human body against injury comprising at least three hybrid fabric layers, each hybrid fabric layer comprising at least one high strength fiber having a tensile modulus of at least about 160 grams/denier and a tenacity of at least about 7 grams/denier and at least one ground fiber, wherein the hybrid fabric layer has a construction selected from the group consisting of a weft knit of the high strength fiber and the ground fiber, a warp knit of the high strength fiber and the ground fiber, an inserted warp knit wherein the high strength fiber is inserted into a warp knit of the ground fiber, and a stitchbonded knit.

2. A pad according to claim 1, wherein the high strength fiber is selected from the group consisting of extended chain polyolefin fiber, aramid fiber, polyvinyl alcohol fiber, polyacrylonitrile fiber and liquid crystal copolyester fiber.

3. A pad according to claim 2, wherein the high strength fiber comprises an extended chain polyethylene fiber.

4. A pad according to claim 1, wherein the high strength fiber has a tensile modulus of at least about 500 grams/denier and a tenacity of at least about 18 grams/denier.

5. A pad according to claim 1, wherein the ground fiber is selected from the group consisting of polyamide fiber, polyester fiber, polyacrylonitrile fiber, polyolefin fiber, polyurethane fiber and natural fiber.

6. A pad according to claim 5, wherein the ground fiber comprises a polyamide fiber.

7. A pad according to claim 6, wherein the ground fiber comprises a nylon 6 or nylon 66 fiber.

8. A pad according to claim 1, wherein the high strength fiber comprises an extended chain polyethylene fiber and the ground fiber comprises a polyamide fiber.

9. A pad according to claim 1, wherein the weft knit construction comprises at least one course of a rib stitch or tubular stitch of a yarn of the ground fiber and at least one course of a tubular stitch of a yarn of the high strength fiber.

10. A pad according to claim 9, wherein the ground fiber comprises a polyamide fiber and the high strength fiber comprises an extended chain polyethylene fiber.

11. A pad according to claim 1, wherein the inserted warp knit construction comprises a yarn of the high strength fiber inserted in the warp direction.

12. A pad according to claim 1, wherein the inserted warp knit construction comprises a yarn of the high strength fiber inserted in the weft direction.

13. A pad according to claim 1, wherein the high strength fiber is unidirectionally aligned in the fabric.

14. A chain saw chap comprising a pad for protecting at least a portion of the human body against injury comprising at least three hybrid fabric layers, each hybrid fabric layer comprising at least one high strength fiber having a tensile modulus of at least about 160 grams/denier and a tenacity of at least about 7 grams/denier and at least one ground fiber, wherein the hybrid fabric layer has a construction selected from the group consisting of a weft knit of the high strength fiber and the ground fiber, a warp knit of the high strength fiber and the ground fiber, an inserted warp knit wherein the high strength fiber is inserted into a warp knit of the ground fiber, and a stitchbonded knit.

* * * * *